US009705121B2

(12) United States Patent
Fuhr et al.

(10) Patent No.: US 9,705,121 B2
(45) Date of Patent: Jul. 11, 2017

(54) LEAD FRAME FOR A BATTERY MODULE

(71) Applicant: Johnson Controls Technology Company, Holland, MI (US)

(72) Inventors: Jason D. Fuhr, Sussex, WI (US); Joerg Birkholz, Sarstedt Lower Saxony (DE); Jonathan P. Lobert, Hartford, WI (US); Marco Jansen, Celle/Grosse Hehlen (DE); Martin Wiegmann, Borstel (DE); Richard M. DeKeuster, Racine, WI (US); Robert J. Mack, Milwaukee, WI (US)

(73) Assignee: Johnson Controls Technology Company, Holland, MI (US)

( * ) Notice: Subject to any disclaimer, the term of this patent is extended or adjusted under 35 U.S.C. 154(b) by 141 days.

(21) Appl. No.: 14/828,149

(22) Filed: Aug. 17, 2015

(65) Prior Publication Data
US 2016/0049630 A1    Feb. 18, 2016

Related U.S. Application Data

(60) Provisional application No. 62/038,670, filed on Aug. 18, 2014.

(51) Int. Cl.
*H01M 2/24* (2006.01)
*H01M 2/20* (2006.01)
(Continued)

(52) U.S. Cl.
CPC ............ *H01M 2/206* (2013.01); *B21D 22/02* (2013.01); *B21D 35/001* (2013.01);
(Continued)

(58) Field of Classification Search
CPC ... B21D 22/02; B21D 35/001; H01M 10/482; H01M 10/613; H01M 10/6563; H01M 2220/20; H01M 2/1077; H01M 2/206
See application file for complete search history.

(56) References Cited

U.S. PATENT DOCUMENTS 5,196,374 A    3/1993    Hundt et al.
5,541,446 A    7/1996    Kierse
(Continued)

FOREIGN PATENT DOCUMENTS

DE    102013207356    10/2014

OTHER PUBLICATIONS

PCT/US2015/045708 International Search Report and Written Opinion dated Nov. 20, 2015.

*Primary Examiner* — Patrick Ryan
*Assistant Examiner* — Ben Lewis
(74) *Attorney, Agent, or Firm* — Fletcher & Yoder, P.C.

(57) ABSTRACT

The present disclosure includes a battery module having a power assembly that includes a plurality of battery cells and a plurality of bus bars that electrically couples a terminal of each of the plurality of battery cells to a terminal of an adjacent battery cell of the plurality of battery cells. The battery module also includes a lead frame that includes a plurality of cell taps respectively electrically coupled to the plurality of bus bars of the power assembly, and a plurality of leads that extends from the plurality of cell taps. The lead frame also includes a plurality of broken interconnects that electrically isolates the plurality of cell taps from one another and electrically isolates the plurality of leads from one another.

23 Claims, 6 Drawing Sheets

(51) Int. Cl.
*B21D 22/02* (2006.01)
*B21D 35/00* (2006.01)
*H01M 10/48* (2006.01)
H01M 2/10 (2006.01)
H01M 10/6563 (2014.01)
H01M 10/613 (2014.01)

(52) U.S. Cl.
CPC ........ *H01M 10/482* (2013.01); *H01M 2/1077* (2013.01); *H01M 10/613* (2015.04); *H01M 10/6563* (2015.04); *H01M 2220/20* (2013.01)

(56) References Cited

U.S. PATENT DOCUMENTS

| | | |
|---|---|---|
| 6,003,369 A | 12/1999 | Tola et al. |
| 7,791,179 B2 | 9/2010 | Edwards |
| 2008/0116550 A1 | 5/2008 | Edwards |
| 2011/0097618 A1* | 4/2011 | Hauck ................... H01M 2/206 429/158 |
| 2011/0244283 A1 | 10/2011 | Seto et al. |

\* cited by examiner

LEAD FRAME FOR A BATTERY MODULE

CROSS REFERENCE TO RELATED APPLICATIONS

This application claims priority from and the benefit of U.S. Provisional Application Ser. No. 62/038,670, entitled "INTEGRATED FAN DUCTING IN A PLASTIC MODULE HOUSING," filed Aug. 18, 2014, which is hereby incorporated by reference.

BACKGROUND

The present disclosure relates generally to the field of batteries and battery modules. More specifically, the present disclosure relates to housing designs for lithium-ion (Li-ion) battery modules.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, it may be desirable to monitor the performance of individual battery cells of the battery module during operation. However, since certain types of battery modules include numerous (e.g., 8, 10, 12, 20, or more) battery cells, it can be challenging to enable performance monitoring at the battery cell level without adding significant cost and complexity to the design of the battery module.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure includes a battery module having a power assembly that includes a plurality of battery cells and a plurality of bus bars that electrically couples a terminal of each of the plurality of battery cells to a terminal of an adjacent battery cell of the plurality of battery cells. The battery module also includes a lead frame that includes a plurality of cell taps respectively electrically coupled to corresponding ones of the plurality of bus bars of the power assembly, and a plurality of leads that extends from the plurality of cell taps. The lead frame also includes a plurality of broken interconnects that electrically isolates the plurality of cell taps from one another and electrically isolates the plurality of leads from one another.

The present disclosure also includes an assembly for manufacturing a lithium-ion battery module. The assembly includes an interconnected metal lead frame secured to a polymer housing cover. The interconnected metal lead frame includes a plurality of cell taps structurally connected together by a first plurality of interconnects, wherein the first plurality of interconnects is configured to be broken to electrically isolate the plurality of cell taps from one another. The metal lead frame includes a plurality leads respectively electrically coupled to the plurality of cell taps, wherein the plurality of leads is structurally connected by a second plurality of interconnects, and wherein the second plurality of interconnects is configured to be broken to electrically isolate the plurality of leads from one another.

The present disclosure also includes a method of manufacturing a battery module. The method includes coupling an interconnected metal lead frame to a polymer housing cover, wherein the interconnected metal lead frame includes a plurality of cell taps, a plurality of leads, and a plurality of interconnects. The method includes simultaneously breaking all of the plurality of interconnects of the interconnected metal lead frame such that each of the plurality of leads of the lead frame is electrically isolated from one another, and such that each of the plurality of cell taps of the lead frame is electrically isolated from one another to form a metal lead frame.

DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a housing and a number of battery cells (e.g., lithium-ion (Li-ion) electrochemical cells) arranged within the housing to provide particular voltages and/or currents useful to power, for example, one or more components of an xEV. As another example, battery modules in accordance with present embodiments may be incorporated with or provide power to stationary power systems (e.g., non-automotive systems).

As mentioned above, it may be desirable to monitor the performance of the battery cells of a battery module. For example, certain battery modules include a control unit that monitors and controls aspects of the battery module during operation. By specific example, such a battery control unit may monitor voltages at multiple points in a power assembly of a battery module. The battery control unit may use this information, possibly in conjunction with other known or measured parameters of the battery module (e.g., temperature, calendar or cycle life, number of battery cells, etc.), to determine or estimate operational parameters of the battery module (e.g., the state of charge of the battery module, the amount of energy remaining in the battery module, the remaining life of the battery module, etc.).

As such, the present disclosure is directed toward embodiments of a battery module with a housing cover that includes a lead frame. As used herein, a "lead frame" refers to a collection of conductive pathways (e.g., metal leads) that are electrically isolated from one another and that individually contact the power assembly of the battery module at multiple points (e.g., at each terminal, between each battery cell, at each bus bar) to enable multiple voltage measurements to be performed by a battery control unit. For example, in certain embodiments discussed below, the lead frame has a corresponding cell voltage tap that is in contact (e.g., direct physical contact, electrical contact) with each bus bar of the power assembly of the battery module to enable the battery control unit to measure voltages at or between each of the battery cells of the power assembly. As discussed in greater detail below, the disclosed lead frame is formed from an "interconnected lead frame," which herein refers to a lead frame having a number of interconnects (which may also be referred to as sacrificial interconnects) that couple the leads of the lead frame to one another, and that couple the cell taps of the lead frame to one another, for structural support. As set forth below, this interconnected lead frame is generally incorporated into a polymer portion of a housing cover of the battery module, and subsequently, the interconnects are removed (e.g., broken or severed) to electrically isolate the cell taps of the lead frame from one another, and to electrically isolate the leads of the lead frame from one another. As discussed below, the disclosed design and method enable the manufacture of a lead frame from an integral piece (e.g., a stamped metal interconnected frame), wherein the aforementioned sacrificial interconnects provide sufficient structural support to reduce or prevent deformation of the conductive pathways until the lead frame is secured in (and supported by) the housing cover of the battery module.

Figure 1:
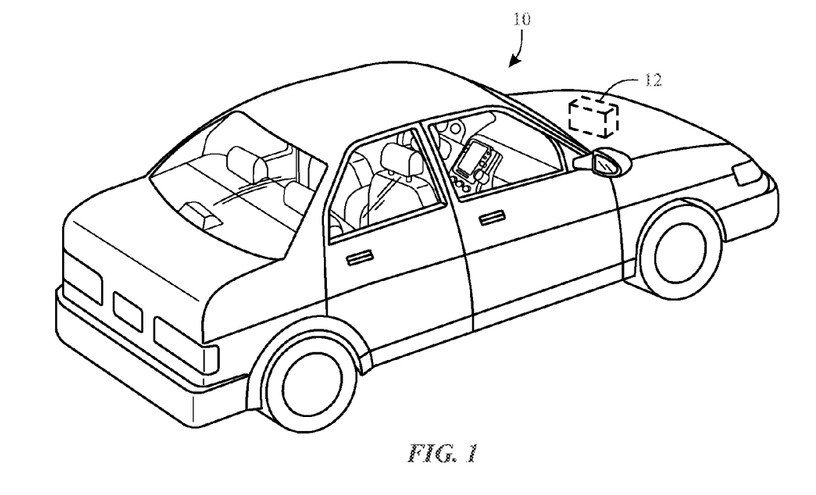
FIG. 1 is a perspective view of a vehicle having a battery system configured in accordance with present embodiments to provide power for various components of the vehicle.

To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, it may be appreciated that the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
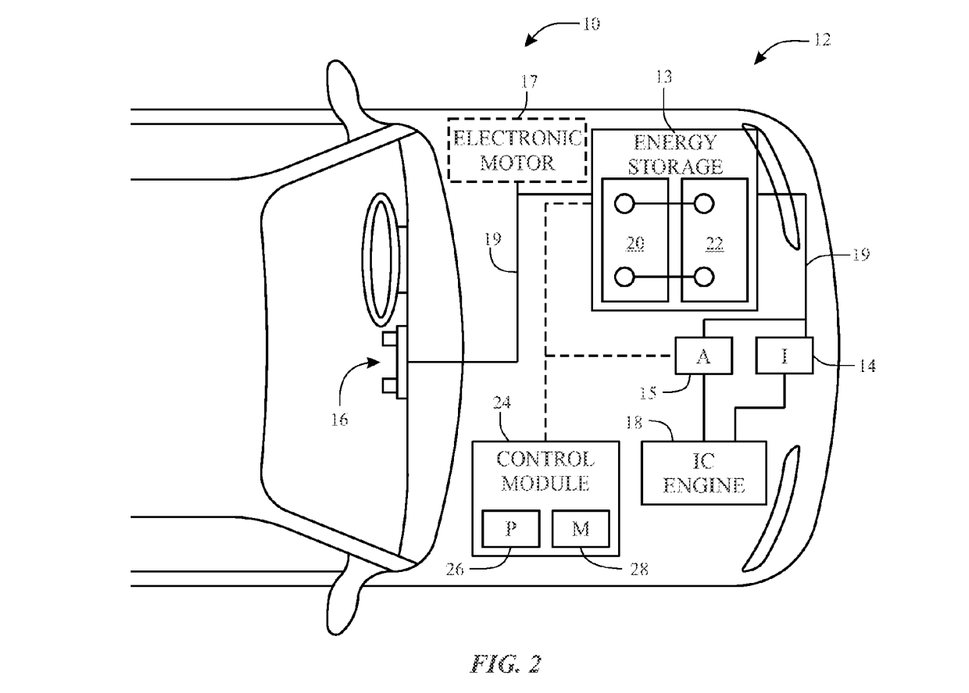
FIG. 2 is a cutaway schematic view of an embodiment of the vehicle and the battery system of FIG. 1.

A more detailed view of the battery system 12 is described in FIG. 2. As depicted, the battery system 12 includes an energy storage component 13 coupled to an ignition system 14, an alternator 15, a vehicle console 16, and optionally to an electric motor 17. Generally, the energy storage component 13 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 13 supplies power to the vehicle console 16 and the ignition system 14, which may be used to start (e.g., crank) the internal combustion engine 18.

Additionally, the energy storage component 13 may capture electrical energy generated by the alternator 15 and/or the electric motor 17. In some embodiments, the alternator 15 may generate electrical energy while the internal combustion engine 18 is running. More specifically, the alternator 15 may convert the mechanical energy produced by the rotation of the internal combustion engine 18 into electrical energy. Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some embodiments, the energy storage component 13 may capture electrical energy generated by the alternator 15 and/or the electric motor 17 during regenerative braking. As such, the alternator 15 and/or the electric motor 17 are generally referred to herein as a regenerative braking system.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12 volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a lithium ion (e.g., a first) battery module 20 and a lead-acid (e.g., a second) battery module 22, which each includes one or more battery cells. In other embodiments, the energy storage component 13 may include any number of battery modules. Additionally, although the lithium ion battery module 20 and lead-acid battery module 22 are depicted adjacent to one another, they may be positioned in different areas around the vehicle. For example, the lead-acid battery module 22 may be positioned in or about the interior of the vehicle 10 while the lithium ion battery module 20 may be positioned under the hood of the vehicle 10.

In some embodiments, the energy storage component 13 may include multiple battery modules to utilize multiple different battery chemistries. For example, when the lithium ion battery module 20 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 24. In particular, the control module 24 may control operations of components in the battery system 12, such as relays (e.g., switches) within energy storage component 13, the alternator 15, and/or the electric motor 17. For example, the control module 24 may regulate amount of electrical energy captured/supplied by each battery module 20 or 22 (e.g., to de-rate and re-rate the battery system 12), perform load balancing between the battery modules 20 and 22, determine a state of charge of each battery module 20 or 22, determine temperature of each battery module 20 or 22, control voltage output by the alternator 15 and/or the electric motor 17, and the like.

Accordingly, the control module 24 may include one or more processor 26 and one or more memory 28. More specifically, the one or more processor 26 may include one or more application specific integrated circuits (ASICs), one or more field programmable gate arrays (FPGAs), one or more general purpose processors, or any combination thereof. Additionally, the one or more memory 28 may include volatile memory, such as random access memory (RAM), and/or non-volatile memory, such as read-only memory (ROM), optical drives, hard disc drives, or solid-state drives. In some embodiments, the control module 24 may include portions of a vehicle control unit (VCU) and/or a separate battery control module.

Figure 3:
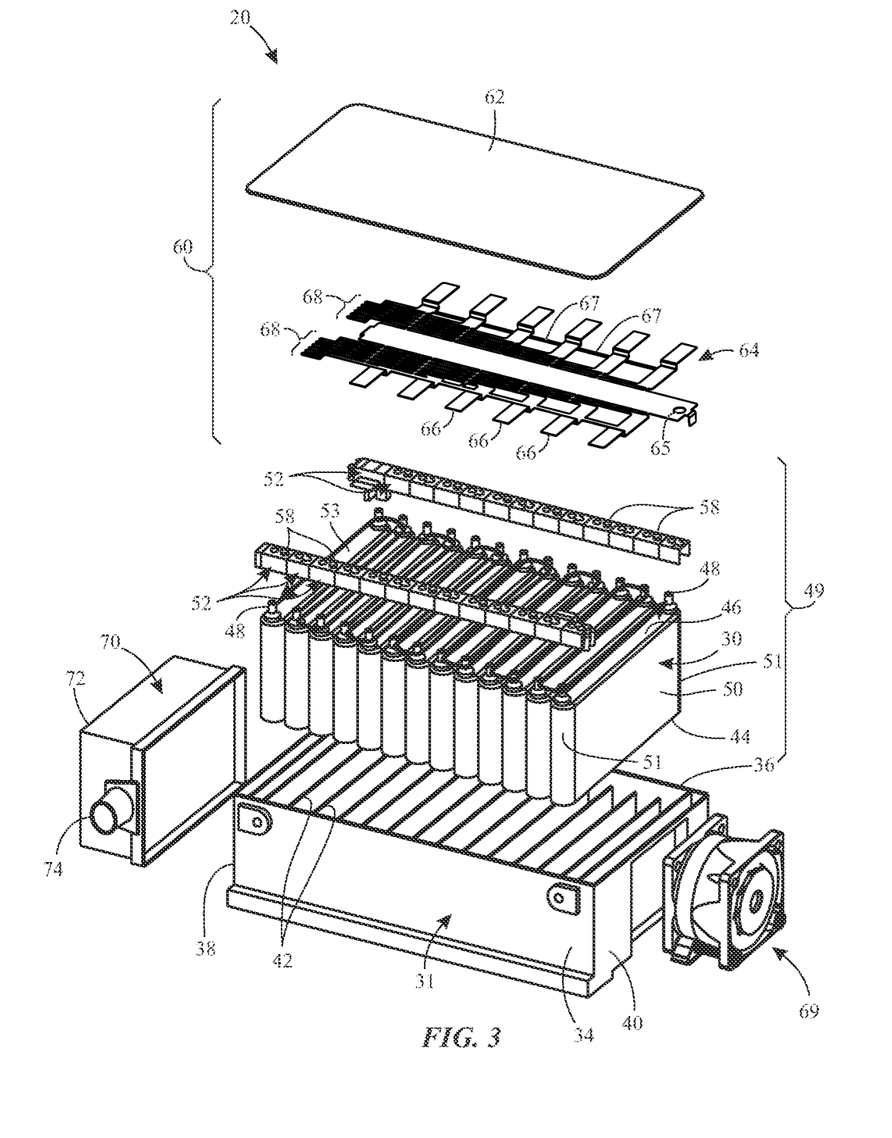
FIG. 3 is an exploded perspective view of an embodiment of a battery module for use in the vehicle of FIG. 1, in accordance with an aspect of the present disclosure.

An exploded perspective view of one embodiment of the lithium-ion (Li-ion) battery module 20, in accordance with the present disclosure, is shown in FIG. 3. In the illustrated embodiment, the battery module 20 includes a number of individual electrochemical cells 30 (e.g., prismatic Li-ion electrochemical cells) housed in a housing 31 of the battery module 20. The illustrated housing 31 includes two lateral sides 34, 36 extending between ends 38, 40 of the housing 31. Partitions 42 extend between the two lateral sides 34, 36, where the partitions 42 define compartments through which the electrochemical cells 30 extend. For example, each electrochemical cell 30 may be received by a corresponding compartment defined by two adjacent partitions 42. In some embodiments, the housing 31 may not include partitions 42. For example, the housing 31 may include an open inside configured to receive electrochemical cells 30 stacked together and inserted into the open inside of the housing 31.

Continuing with the illustrated embodiment, the electrochemical cells 30 each include a base end 44, a terminal end 46 (having terminals 48 extending therefrom), and two broad faces 50 (e.g., broad sides) opposite to one another and extending between the base end 44 and the terminal end 46. The electrochemical cells 30 also include thin or narrow faces 51 (e.g., thin sides, thin faces, narrow sides, intervening faces, intervening sides) extending between the base end 44, the terminal end 46, and the two broad faces 50. It should be noted that, in other embodiments, the narrow faces 51 may not be narrow, and that the narrow faces 51 may actually be curved portions extending between the two broad faces 50. The term "narrow" is intended to differentiate the narrow faces 51 and broad sides 50 in the illustrated embodiment, but, in another embodiment, the sides 50, 51 (e.g., faces) may be sized differently than is shown. In the illustrated embodiment, the electrochemical cells 30 are disposed into the housing 31 such that the faces 50 of adjacent electrochemical cells 30 are disposed proximate to each other, and separated by one of the partitions 42. It should be noted, however, that the housing 31 may not include the partitions 42. For example, all the electrochemical cells 30 may be stacked broad face 50 to broad face 50 in a single row, and the single row may be disposed into the housing 31 (e.g., having no partitions 42). Further, the geometry of the electrochemical cell 30 used for battery modules 20 in accordance with the present disclosure may vary. For example, the electrochemical cells 30 may be cylindrical electrochemical cells, prismatic electrochemical cells, pouch cells, or some other type of cells. The housing 31 may also include a different geometry than is shown in the illustrated embodiment. For example, the housing 31 may be configured (e.g., shaped, sized, oriented) to accommodate electrochemical cells 30 other than those shown in the illustrated embodiment.

As shown, the battery module 20 includes coupling mechanisms 52 for coupling the terminals 48 of adjacent electrochemical cells 30 to form the power assembly 49 of the battery module. The term "power assembly," as used herein, refers to the battery cells 30 coupled together via the coupling mechanisms 52. In certain embodiments, the coupling mechanisms 52 may couple electrochemical cells 30 in series or in parallel by providing an electrical path between like terminals 48 (e.g., two positive terminals 48) or unalike terminals 48 (e.g., one positive terminal 48 and one negative terminal 48). In the illustrated embodiment, adjacent electrochemical cells 30 are coupled in series, and these couplings are replicated throughout the power assembly 49 of the battery module 20. In this manner, the end terminals 48 represent electrical contacts to an aggregated network of connections between all of the electrochemical cells 30. In other words, the aggregated network of connections zig-zags through the electrochemical cells 30, as shown by arrow 53. Lead terminals 48 (or lead coupling mechanisms) on either end of the row of electrochemical cells 30 may be coupled to busses that couple the battery module 20 to a load (not shown), thereby providing a charge to the load.

In accordance with the present disclosure, the coupling mechanisms 52 between adjacent terminals 48 may vary depending on the embodiment. For the embodiment illustrated in FIG. 3, the coupling mechanisms are implemented as bus bars 52. As mentioned, the illustrated bus bars 52 can be used to couple two adjacent terminals 48 of two adjacent electrochemical cells 30 either in series, as illustrated in FIG. 3, or in parallel. In other embodiments, the electrochemical cells 30 may include flanged terminals 48 configured to directly couple to adjacent flanged terminals. In still other embodiments, the coupling mechanism 52 may include an assembly of various parts (e.g., adapters and bus bars) configured to transition an electrical path between the terminals 48 from one material to another. For the bus bars 52 illustrated in FIG. 3, each includes an extension 58 (e.g., a protrusion) that extends up and away from the remainder of the power assembly 49. The extensions 58 of the bus bars 52 are integral with the bus bars 52, and therefore, each extension 58 is in electrical communication with the two particular terminals of neighboring battery cells 30 that are bridged by a particular bus bar 52.

Additionally, the battery module 20 illustrated in FIG. 3 includes a housing cover assembly 60 disposed over the power assembly 49. In general, the housing cover assembly 60 includes a polymer portion 62 (e.g., a thermoplastic or thermosetting polymer) disposed around a metal lead frame 64. The illustrated lead frame 64 includes a central support portion 65 that is structurally and electrically isolated from the remainder of the lead frame 64. The lead frame 64 includes a number of cell taps 66, structurally and electrically isolated from one another. Further, the illustrated lead frame 64 includes a number of leads 68 that respectively extend from (e.g., are integral with and electrically connected to) the cell taps 66, and which are structurally and electrically isolated from one another. It may be appreciated that, as discussed in greater detail below, the structural and electrical isolation provided between the plurality of cell taps 66 and between the corresponding plurality of leads 68 is enabled by a plurality of broken interconnects 67.

The cell taps 66 of the lead frame 64 illustrated in FIG. 3 are designed to contact multiple points of the power assembly 49 to enable multiple voltage measurements to be performed by a control unit 70, discussed in greater detail below. For example, in certain embodiments, the lead frame 64 of the housing cover assembly 60 contacts (e.g., directly contacts, electrically contacts) at least a portion of the coupling mechanisms 52 (e.g., extensions 58 of the bus bars 52) or at least a portion of the terminals of the battery cells 30 of the power assembly 49. Further, the leads 68 are designed to individually electrically couple each cell tap 66 to the control unit 70 of the battery module 20 to enable voltage measurements to be performed between any two cell taps 66 of the lead frame 64.

In the illustrated embodiment, a fan 69 is disposed proximate to one end 40 of the housing 31 that generates airflow proximate to the housing 31 (or within various portions of the housing 31). The illustrated embodiment also includes the control unit 70 disposed proximate to the end 38 of the housing 31, opposite to the end 40 having the fan 69. In some embodiments, the fan 69 may be disposed on the same end of the battery module 20 having the control unit 70. Further, in some embodiments, the battery module 20 may not include the fan 69, the control unit 70, or both.

The control unit 70 may include an outer casing 72 configured to retain various electronic components of the battery module 20. The control unit 70 may include a communication port 74 coupled to the electronic component(s) in the control unit 70, extending through the outer casing 72, and configured to receive a cable for transmitting information relating to the battery module 20 from the control unit 70 to a processor, control unit, or display disposed external to the battery module 20. Accordingly, operational parameters (e.g., voltage, temperature, efficiency, energy density) of the battery module 20 may be measured or determined and output to external hardware for monitoring and for ease of access. For example, an operator may couple a cable between the communication port 74 of the control unit 70 and an operator display external to the battery module 20, such that operational parameters are transmitted through the cable to the operator display and the operator can easily access and monitor the operating parameters of the battery module 20. Indeed, the control unit 70 may include a processor and memory (e.g., similar to the hardware discussed above with respect to the control module 24 of the energy storage system 13 of FIG. 2) that are configured to store or track information relating to the battery module 20 over time, thereby providing a time history of the operating parameters of the battery module 20 to the operator.

In general, the electronic components of the control unit 70 include a number of voltage sensors that are electrically coupled to the leads 68 of the lead frame 64, which, in turn, are in electrical communication with different portions of the power assembly 49 via the cell taps 66. It may be appreciated that the control unit 70 may also include voltage sensors that are connected to the lead terminals 48 of the power assembly 49. Accordingly, the voltage sensors of the control unit 70 are in electrical communication with, and able to perform voltage measurements between, any two cell taps 66 of the lead frame 64. For example, in certain embodiments, one cell tap 66 may contact each bus bar 52 of the power assembly 49, and the control unit 70 may be capable of measuring the individual voltage output of each battery cell 30 by measuring the voltage between the two bus bars 52 that couple the battery cell 30 to its neighboring battery cells 30 in the power assembly 49, and by measuring the voltage between the connected bus bar 52 and the external terminal 48 for the battery cells 30 disposed at the ends of the power assembly 49. Further, as mentioned, the control unit 70 may include a processor and memory that are communicatively coupled to the aforementioned voltage sensors, temperature sensors, or any other sensors suitable for the battery module 20, to monitor the operational parameters of the battery module 20.

Figure 4:
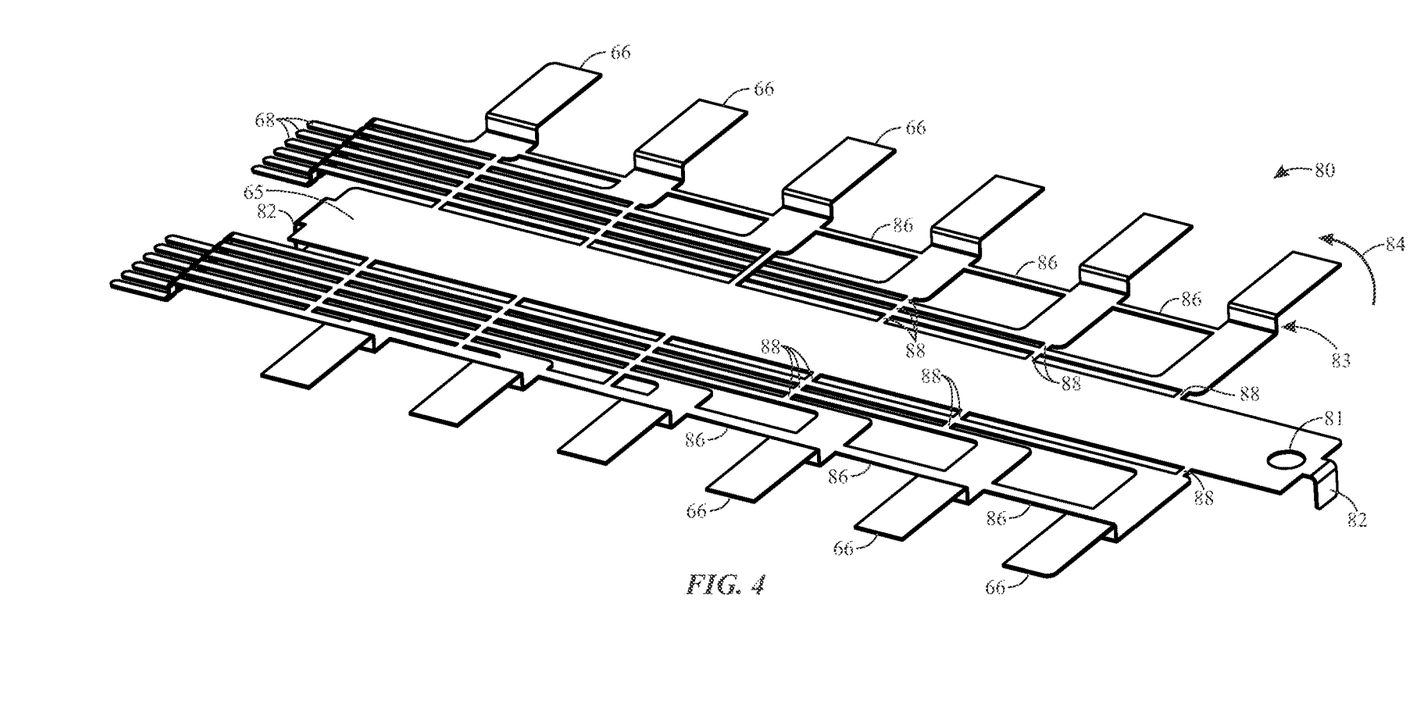
FIG. 4 is a perspective view of an embodiment of the lead frame for the housing cover assembly of FIG. 3, in accordance with an aspect of the present disclosure.

FIG. 4 illustrates a perspective view of an embodiment of an interconnected lead frame 80, such as may be used in the manufacture of the housing cover assembly 60 of FIG. 3. In certain embodiments, the interconnected lead frame 80 may be made from a single metal (e.g., aluminum, copper), or may be made from multiple metallic materials (e.g., having aluminum portions and copper portions). Additionally, in certain embodiments, the interconnected lead frame 80 may be manufactured using a cost-effective metal stamping operation, wherein a piece of sheet metal may be stamped to form the integral metal lead frame 80 illustrated in FIG. 4.

The central support portion 65 of the interconnected lead frame 80 illustrated in FIG. 4 includes an opening 81 and an extensions 82 (e.g., tabs 82) that may be used to secure the interconnected lead frame 80 within the housing cover assembly 60. In other embodiments, other portions of the interconnected lead frame 80 may include similar openings and or extensions that may be coupled to (e.g., mated with) corresponding structures of the polymer portion 62 to secure the interconnected lead frame 80 within the housing cover assembly 60. As discussed below, in certain embodiments, the polymer portion 62 may be formed (e.g., insert molded, overmolded) around the interconnected lead frame 80, and polymer may at least partially fill the opening 81, at least partially surround the extensions 82, or both, to secure the interconnected lead frame 80 on or within the housing cover assembly 60.

As mentioned, the embodiment of the interconnected lead frame 80 illustrated in FIG. 4 includes a number of cell taps 66 that are designed to contact the extensions 58 of the bus bars 52 of the power assembly 49. As illustrated, in certain embodiments, the cell taps 66 may include one or more curved portions 83 that may impart a spring force in the direction 84 (e.g., toward the extensions 58 of the bus bars 52 illustrated in FIG. 3) in order to maintain physical, electrical contact with portions of the power assembly 49 of the battery module 20, despite vibration and thermal expansion/contraction of the interconnected lead frame 80. Further, the cell taps 66 of the interconnected lead frame 80 illustrated in FIG. 4 are connected together (e.g., structurally and electrically coupled) by a number of sacrificial interconnects 86.

The interconnected lead frame 80 illustrated in FIG. 4 includes a number of leads 68 that extend from (e.g., are integral with and electrically connected to) the cell taps 66. As mentioned above, these leads 68 electrically couple to voltage sensors of the control unit 70 of the battery module 20 to enable a plurality of voltage measurements of the power assembly 49 to be performed. Like the cell taps 66, the leads 68 of the interconnected lead frame 80 are also connected together (e.g., structurally and electrically coupled) by a number of sacrificial interconnects 88.

The sacrificial interconnects 86 and 88 generally provide structural support to the interconnected lead frame 80 during the manufacture of the housing cover assembly 60. It may be appreciated that, when the sacrificial interconnects 86 and 88 are broken (e.g., severed, partially removed), the interconnected lead frame 80 illustrated in FIG. 4 is transformed into a disconnected (e.g., electrically isolated) set of cell taps 66 and corresponding leads 68, as illustrated by the lead frame 64 of FIG. 3. In certain embodiments, the sacrificial interconnects 86 and 88 may be structurally weakened relative to the remainder of the lead frame 80 to facilitate breaking at the sacrificial interconnects 86 and 88. For example, in certain embodiments, the sacrificial interconnects 86 and 88 may have one or more dimensions (e.g., height, width, thickness) that are smaller than the corresponding dimensions of the leads 68 to render the sacrificial interconnects 86 and 88 weaker than the leads 68 of the interconnected lead frame 80. Additionally or alternatively, in certain embodiments, the sacrificial interconnects 86 and 88 may be scored or notched to render the sacrificial interconnects 86 and 88 weaker than other portions (e.g., leads 68) of the lead frame 80.

As such, the sacrificial interconnects 86 and 88 enable the interconnected lead frame 80 of FIG. 4 to be produced as a single, integral structure, for example, using a metal stamping process. Subsequently, once the interconnected lead frame 80 has been secured to the polymer portion 62 of the housing cover assembly 60, the sacrificial interconnects 86 and 88 can be severed, as discussed below. As such, embodiments of the presently disclosed housing cover assembly 60 provide substantial cost savings by enabling an efficient way to simultaneously provide a plurality of electrically isolated cell taps 66 and corresponding leads 68 from a relatively inexpensive single metal structure.

Figure 5:
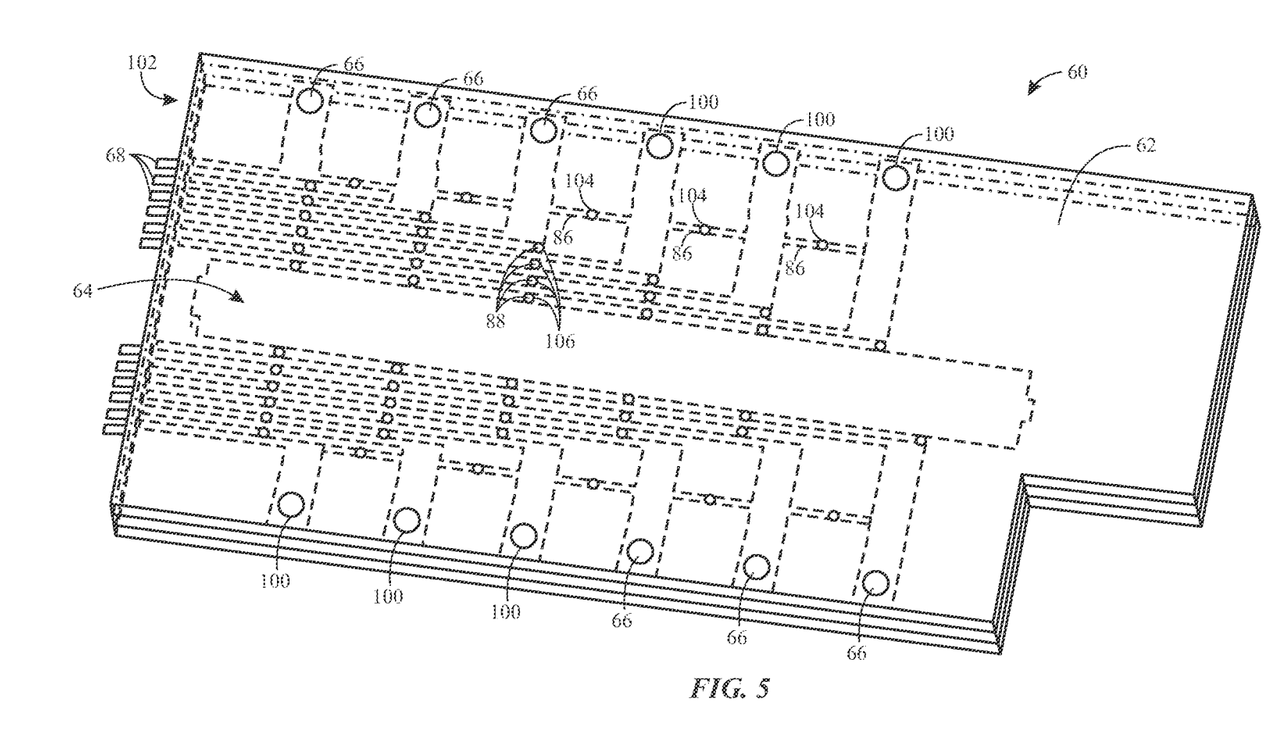
FIG. 5 is a perspective view of an embodiment of the housing cover assembly for battery module of FIG. 3, in accordance with an aspect of the present disclosure.

FIG. 5 is a perspective view of the bottom face of an embodiment of the housing cover assembly 60 of FIG. 3. The illustrated embodiment includes polymer portion 62 molded around the lead frame 64. As such, for the illustrated embodiment, portions of the lead frame 60 are disposed under a layer of polymer to secure the lead frame 60 within the housing cover assembly 60. In certain embodiments, substantially all of the lead frame 60 may be disposed under a layer of polymer, with the exception of the various access holes, described below, that may be formed during the molding process. Additionally, for the illustrated embodiment, the leads 68 extend from an end 102 of the housing cover assembly 62 in order to contact corresponding leads (not shown) extending from the control unit 70.

For the illustrated embodiment of FIG. 5, the cell taps 66 are exposed by the cell tap access holes 100, which are suitable sized and shaped to enable the extensions 58 of the bus bars 52 to pass through the polymer layer and to contact the cell taps 66. As illustrated, in certain embodiments, the cell taps 66 are completely covered with polymer 62, except at the cell tap access holes 100. Additionally, for the illustrated embodiment, the leads 68 are also completely covered with polymer, except at the end 102, wherein the leads 68 may be at least partially exposed to enable electrical contact with leads from the control unit 70. In other embodiments, a greater portion of the cell taps 66 and/or leads 68 may be exposed (e.g., not covered by polymer 62) without negating the effect of the present approach.

The remaining access holes of the housing cover assembly 60 illustrated in FIG. 5 are access holes that are suitable sized and shaped to enable the sacrificial interconnects 86 between the cell taps 66 and the sacrificial interconnects 88 between the leads 68 to be accessed and broken (e.g., using a punch press). More specifically, for the illustrated embodiment, the housing cover assembly 60 includes a number of interconnect access holes 104 that are aligned with the sacrificial interconnects 86 that couple together the cell taps 66 of the lead frame 64, as well as a number of interconnect access holes 106 that are aligned with the sacrificial interconnects 88 that couple together the leads 68 of the lead frame 64. As such, the interconnect access holes 104 and 106 enable simultaneous access to the sacrificial interconnects 86 and 88 such that the interconnected lead frame 80 (illustrated in FIG. 4) can be modified to provide the fully-formed, disconnected lead frame 64 illustrated in FIGS. 3 and 5, wherein each of the cell taps 66 are structurally and electrically isolated from one another and each of the leads 68 are structurally and electrically isolated from one another.

Figure 6:
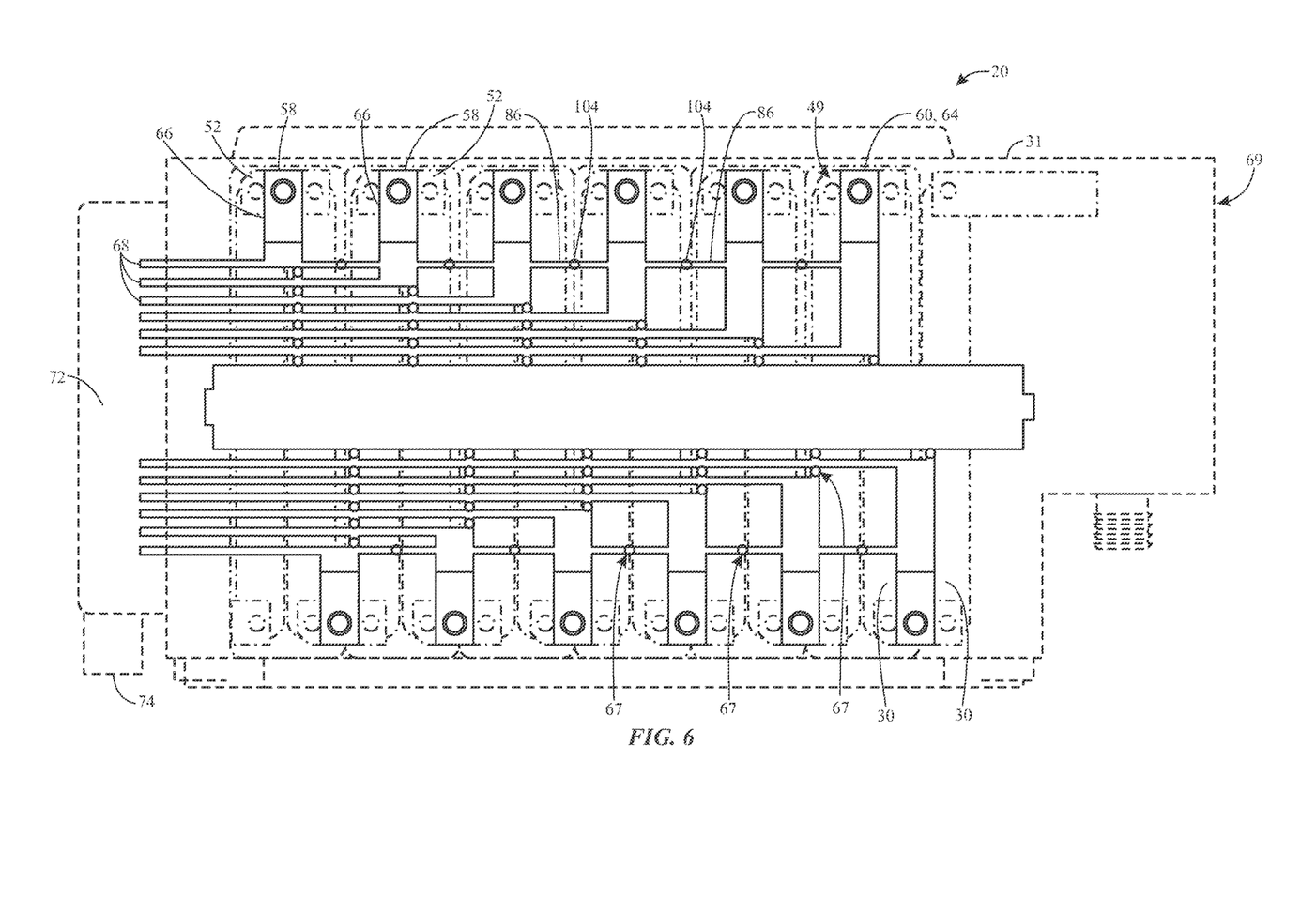
FIG. 6 is a top-down view of an embodiment of the battery module of FIG. 3, in accordance with an aspect of the present disclosure.

FIG. 6 is a top-down view of the embodiment of the battery module 20 illustrated in FIG. 3, wherein the polymer portion 62 of the housing cover assembly 60 is not shown for illustrative purposes. For the embodiment illustrated in FIG. 6, each cell tap 66 of the lead frame 60 is in contact with an extension 58 of a bus bar 52 of the power assembly 49. As such, for the illustrated embodiment, each cell tap 66, in conjunction with the corresponding lead 68, provides a conductive pathway that extends from each bus bar 52, to the end 38 of the housing 31, wherein each of the leads 68 of the lead frame 64 are coupled to corresponding leads of the control unit 70. More specifically, the illustrated lead frame 60 includes a plurality of broken interconnects 67 that are each aligned with an interconnect access holes 104 or 106, and these broken interconnects 67 electrically isolate the cell taps 66 from one another and electrically isolate the leads 68 from one another. As such, the housing cover assembly 60 of the illustrated battery module 20 enables the control unit 70 to perform voltage measurements between different portions (e.g., between individual battery cells 30, between groups of battery cells 30) of the power assembly 49 during operation.

Figure 7:
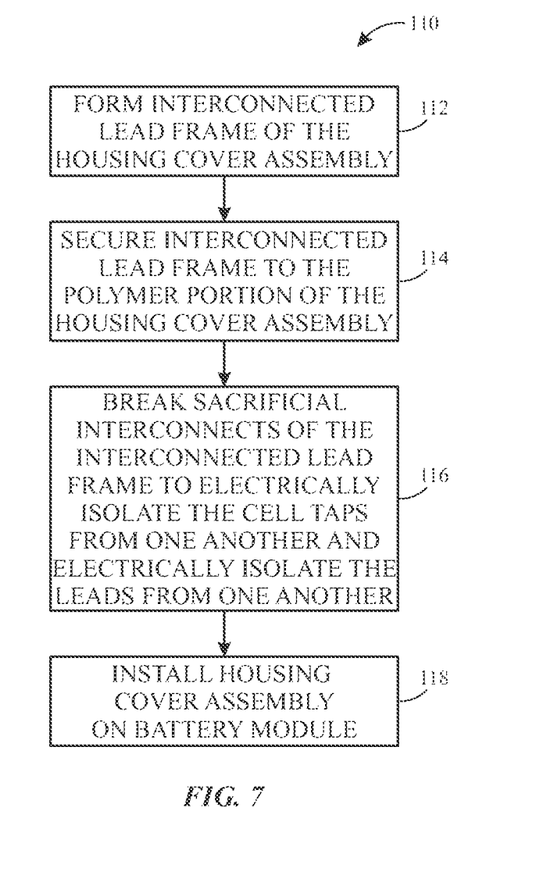
FIG. 7 is a flow diagram of an embodiment of a method for manufacturing the battery module of FIG. 3.

FIG. 7 is a flow diagram illustrating an embodiment of a process 110 for manufacturing the battery module 20. The illustrated process 110 begins with forming (block 112) the interconnected metal lead frame 80. In certain embodiments, the interconnected lead frame 80 may be formed by stamping a sheet of metal (e.g., aluminum, copper, or a combination thereof) into the shape illustrated in FIG. 4. In other embodiments, the lead frame 80 may be formed using a die cast, or by automated welding of individual metal components.

The process 110 illustrated in FIG. 7 continues with securing (block 114) the interconnected lead frame 80 to the polymer portion 62 of the housing cover assembly 60. In certain embodiments, the interconnected lead frame 80 may be snapped into preformed channels in the polymer portion 62 of the housing cover assembly 60, or may include mating features (e.g., extensions, tabs, holes) that correspond to structures preformed in the polymer 62 to secure the interconnected lead frame 80 to the polymer portion 62 of the housing cover assembly 60. In certain embodiments, the polymer 62 may be formed (e.g., insert molded, overmolded) around the interconnected lead frame 80, as described above, to secure the interconnected lead frame 80 within the housing cover assembly 60.

As illustrated in FIG. 7, after the interconnected lead frame 80 and the polymer portion 62 of the housing cover assembly 60 are coupled together, then the sacrificial interconnects 86 and 88 are broken (block 116) to electrically isolate the cell taps 66 of the interconnected lead frame 80 from one another, and to electrically isolate the leads 68 of the interconnected lead frame 80 from one another, yielding the housing cover assembly 60 having the lead frame 64 with electrically isolated cell taps 66 and corresponding leads 68. As mentioned above, in certain embodiments, the sacrificial interconnects 86 and 88 may be broken using a punch press. In other embodiments, the sacrificial interconnects 86 and 88 may be liquefied and/or vaporized using a heat source (e.g., an electrical arc, a laser) to remove or sever a portion of the interconnects.

The illustrated process 110 concludes with the installation (block 118) of the housing cover assembly 60 on the battery module 20. As set forth above, the housing cover assembly 60 is installed such that the cell taps 66 are in contact with different portions of the power assembly 49 of the battery module. Further, as mentioned, in certain embodiments, the polymer portion 62 of the housing cover assembly 60 may include cell tap access holes 100, as illustrated in FIG. 5, that align with and receive extensions 58 of the bus bars 52 to enable the extensions 58 to reach the cell taps 66, and possibly to secure the housing cover assembly 60 to the battery module 20.

One or more of the disclosed embodiments, alone or in combination, may provide one or more technical effects useful in the manufacture of battery modules, and portions of battery modules. In general, the disclosed battery modules include a lead frame, which provides electrically isolated cell taps and leads that enable voltage monitoring throughout the power assembly of the battery module. Moreover, the disclosed lead frame is formed from an interconnected lead frame, which can be manufactured as an integral, stamped metal part. As discussed, the disclosed sacrificial interconnects of the interconnected lead frame provide structural support to reduce or prevent deformation of the conductive pathways until the lead frame is secured in the housing cover assembly, after which the interconnects may be simultaneously removed (e.g., using a punch press). By using an integral interconnected lead frame that is subsequently separated into individual conductive pathways, considerable time and expense may be avoided compared to other battery module designs. The technical effects and technical problems in the specification are exemplary and are not limiting. It should be noted that the embodiments described in the specification may have other technical effects and can solve other technical problems.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the disclosed subject matter. The order or sequence of any process or method steps may be varied or re-sequenced according to alternative embodiments. Furthermore, in an effort to provide a concise description of the exemplary embodiments, all features of an actual implementation may not have been described. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A battery module, comprising:
   a power assembly, comprising:
      a plurality of battery cells; and
      a plurality of bus bars that electrically couples a terminal of each of the plurality of battery cells to a terminal of an adjacent battery cell of the plurality of battery cells;
   a lead frame, comprising:
      a plurality of cell taps respectively electrically coupled to corresponding ones of the plurality of bus bars of the power assembly;
      a plurality of leads that extends from the plurality of cell taps; and
      a plurality of broken interconnects that electrically isolates the plurality of cell taps from one another and electrically isolates the plurality of leads from one another; and
   a housing cover that is insert molded around the lead frame, wherein the housing cover comprises a plurality of access holes that are respectively aligned with the plurality of broken interconnects of the lead frame.

2. The battery module of claim 1, wherein the plurality of access holes is disposed only on a bottom face of the housing cover.

3. The battery module of claim 1, wherein the plurality of bus bars electrically couples the plurality of battery cells in series.

4. The battery module of claim 1, comprising a control unit that is electrically connected to each of the plurality of leads of the lead frame, wherein the control unit is configured to measure a respective voltage at each of the plurality of bus bars via the plurality of leads.

5. The battery module of claim 4, wherein the control unit is configured to determine an individual voltage output of each of the plurality of battery cells based on the respective voltages measured at each of the plurality of bus bars.

6. The battery module of claim 1, wherein the battery module is a battery module of an xEV.

7. The battery module of claim 1, wherein the a plurality of battery cells of the battery module are lithium-ion battery cells.

8. An assembly for manufacturing a lithium-ion battery module, comprising:
   an interconnected metal lead frame secured to a polymer housing cover, wherein the interconnected metal lead frame comprises:
      a plurality of cell taps structurally connected together by a first plurality of interconnects, wherein the first plurality of interconnects is configured to be broken to electrically isolate the plurality of cell taps from one another; and
      a plurality leads respectively electrically coupled to the plurality of cell taps, wherein the plurality of leads is structurally connected by a second plurality of interconnects, and wherein the second plurality of interconnects is configured to be broken to electrically isolate the plurality of leads from one another.

9. The assembly of claim 8, wherein the polymer housing cover is insert molded around the interconnected metal lead frame.

10. The assembly of claim 8, wherein the polymer housing cover is overmolded around the interconnected metal lead frame.

11. The assembly of claim 8, wherein the polymer housing cover includes a plurality of access holes that are aligned with the first and the second plurality of interconnects of the interconnected metal lead frame to enable the first and the second plurality of interconnects to be broken.

12. The assembly of claim 8, wherein the interconnected metal lead frame is a stamped metal interconnected lead frame.

13. The assembly of claim 8, wherein the interconnected metal lead frame comprises one or more tabs configured to extend into one or more corresponding slots of the polymer housing cover to secure the interconnected metal lead frame to the polymer housing cover.

14. The assembly of claim 8, wherein first and second plurality of interconnects have a dimension that is smaller than a corresponding dimension of the plurality of leads.

15. The assembly of claim 8, wherein each of the first and second plurality of interconnects comprises a score or notch that reduces a structural strength of the interconnected metal lead frame at the first and second plurality of interconnects.

16. The assembly of claim 8, wherein the interconnected metal lead frame is an aluminum lead frame.

17. The assembly of claim 8, wherein the interconnected metal lead frame is a copper lead frame.

18. A method of manufacturing a battery module, comprising:
   coupling an interconnected metal lead frame to a polymer housing cover, wherein the interconnected metal lead frame includes a plurality of cell taps, a plurality of leads, and a plurality of interconnects; and
   simultaneously breaking all of the plurality of interconnects of the interconnected metal lead frame such that each of the plurality of leads is electrically isolated from one another, and such that each of the plurality of cell taps is electrically isolated from one another, to form a metal lead frame.

19. The method of claim 18, comprising stamping a sheet of metal to form the metal lead frame.

20. The method of claim 18, wherein the plurality of interconnects are simultaneously mechanically broken using a punch press.

21. The method of claim 18, wherein coupling the interconnected metal lead frame to the polymer housing cover comprises insert molding or overmolding the polymer housing cover around the interconnected metal lead frame.

22. The method of claim 18, comprising attaching the polymer housing cover with the metal lead frame onto the battery module such that each of the plurality of cell taps is in electrical contact with only one bus bar of the battery module.

23. The method of claim 18, comprising electrically coupling each of the plurality of leads of the metal lead frame to a control unit of the battery module.

* * * * *

UNITED STATES PATENT AND TRADEMARK OFFICE
CERTIFICATE OF CORRECTION

PATENT NO. : 9,705,121 B2
APPLICATION NO. : 14/828149
DATED : July 11, 2017
INVENTOR(S) : Jason D. Fuhr It is certified that error appears in the above-identified patent and that said Letters Patent is hereby corrected as shown below:

In the Specification

1. In Column 1, Line 39, delete "full hybrid systems (FHEVs)" and insert -- Full hybrid electric vehicles (FHEVs) --, therefor.
2. In Column 1, Line 42, delete "mild hybrid systems (MHEVs)" and insert -- mild hybrid electric vehicles (mHEVs) --, therefor.
3. In Column 2, Line 57, delete "a plurality leads" and insert -- a plurality of leads --, therefor.
4. In Column 3, Line 8, delete "DRAWINGS" and insert -- BRIEF DESCRIPTION OF THE DRAWINGS --, therefor.
5. In Column 9, Lines 41-42, delete "an extensions 82" and insert -- extensions 82 --, therefor.
6. In Column 9, Line 46, delete "and or" and insert -- and/or --, therefor.
7. In Column 10, Line 52, delete "lead frame 60" and insert -- lead frame 64 --, therefor.
8. In Column 10, Line 53, delete "lead frame 60" and insert -- lead frame 64 --, therefor.
9. In Column 10, Line 55, delete "lead frame 60" and insert -- lead frame 64 --, therefor.
10. In Column 10, Lines 59-60, delete "housing cover assembly 62" and insert -- housing cover assembly 60 --, therefor.
11. In Column 11, Line 33, delete "lead frame 60" and insert -- lead frame 64 --, therefor.
12. In Column 11, Lines 40-41, delete "lead frame 60" and insert -- lead frame 64 --, therefor.

In the Claims

13. In Column 13, Line 51, in Claim 7, delete "the a" and insert -- the --, therefor.
14. In Column 13, Line 64, in Claim 8, delete "a plurality leads" and insert -- a plurality of leads --, therefor.

Signed and Sealed this
Seventeenth Day of April, 2018

Andrei Iancu
*Director of the United States Patent and Trademark Office*